United States Patent
Cheng (10) Patent No.: US 10,173,710 B1
(45) Date of Patent: Jan. 8, 2019

(54) CART

(71) Applicant: Unique Product & Design Co., LTD., Tainan (TW)

(72) Inventor: Chih-Ching Cheng, Tainan (TW)

(73) Assignee: Unique Product & Design., Ltd., Tainan (TW)

( * ) Notice: Subject to any disclaimer, the term of this patent is extended or adjusted under 35 U.S.C. 154(b) by 0 days.

(21) Appl. No.: 15/624,738

(22) Filed: Jun. 16, 2017

(51) Int. Cl.
*B62B 7/06* (2006.01)
*B62B 3/02* (2006.01)
*F16H 19/00* (2006.01)
*F16B 12/40* (2006.01)

(52) U.S. Cl.
CPC .................. *B62B 7/06* (2013.01); *B62B 3/02* (2013.01); *F16B 12/40* (2013.01); *F16H 19/001* (2013.01); *B62B 2202/404* (2013.01); *B62B 2202/42* (2013.01)

(58) Field of Classification Search
CPC ....... B62B 7/06; B62B 3/02; B62B 2202/404; B62B 2202/42; B62B 7/062; B62B 7/064; B62B 7/086; F16H 19/001; F16B 12/40
See application file for complete search history.

(56) References Cited

U.S. PATENT DOCUMENTS

| | | | | |
|---|---|---|---|---|
| 3,972,563 | A * | 8/1976 | Gustafsson | B60N 2/2251 297/362 |
| 4,544,178 | A * | 10/1985 | Al-Sheikh | B62B 7/062 280/642 |
| 6,698,300 | B2 * | 3/2004 | Swan | E05B 81/25 292/201 |
| 7,401,803 | B1 * | 7/2008 | Lai | B62B 7/08 280/47.38 |
| 7,617,569 | B2 * | 11/2009 | Liao | B62B 3/12 16/297 |
| 7,632,035 | B2 * | 12/2009 | Cheng | B62B 7/008 280/642 |
| 7,832,756 | B2 * | 11/2010 | Storm | B62B 7/062 280/642 |
| 8,226,110 | B2 * | 7/2012 | Liao | B62B 7/062 280/47.38 |
| 8,308,391 | B2 * | 11/2012 | Cheng | B62B 7/008 280/642 |
| 8,517,412 | B2 * | 8/2013 | Tsai | B62B 7/08 280/647 |

(Continued)

FOREIGN PATENT DOCUMENTS

| | | |
|---|---|---|
| CN | 201520324 U | 7/2010 |
| CN | 203819304 U | 9/2014 |

(Continued)

*Primary Examiner* — Jacob B Meyer
(74) *Attorney, Agent, or Firm* — Alan D. Kamrath; Kamrath IP Lawfirm, P.A.

(57) ABSTRACT

A cart, at least a folding joint mechanism disposed among an upper frame, a bottom frame and a rear wheel frame, comprising a bottom frame joint having a first arc-rack, an upper frame joint having a second arc-rack, a rear wheel frame joint, and a linkage gear unit disposed between the upper and bottom frame joints, the linkage gear unit having a first and a second gears rotating coaxially and engaging with the first and second arc-rack respectively, and the first and second gears having the numbers N1 and N2 of gear teeth respectively, and wherein N1 and N2 are greater than or equal to 6.

9 Claims, 12 Drawing Sheets

(56) References Cited

U.S. PATENT DOCUMENTS

| | | | | |
|---|---|---|---|---|
| 8,899,613 B2* | 12/2014 | Cheng | ...................... | B62B 7/008 |
| | | | | 280/47.38 |
| 9,187,113 B2* | 11/2015 | Cheng | ...................... | B62B 7/008 |
| 9,199,658 B2 | 12/2015 | Chuah | | |
| 9,315,205 B2* | 4/2016 | Chuah | ...................... | B62B 7/062 |
| 9,365,230 B2* | 6/2016 | Cheng | ...................... | B62B 7/008 |
| 2006/0071451 A1* | 4/2006 | Cheng | ...................... | B62B 7/008 |
| | | | | 280/642 |
| 2008/0109994 A1* | 5/2008 | Liao | .......................... | B62B 3/12 |
| | | | | 16/319 |
| 2008/0258436 A1* | 10/2008 | Storm | ...................... | B62B 7/062 |
| | | | | 280/642 |
| 2010/0045002 A1* | 2/2010 | Cheng | ...................... | B62B 7/008 |
| | | | | 280/650 |
| 2011/0084467 A1* | 4/2011 | Liao | ........................ | B62B 7/062 |
| | | | | 280/642 |
| 2013/0025387 A1* | 1/2013 | Cheng | ...................... | B62B 7/008 |
| | | | | 74/89.18 |
| 2015/0054239 A1* | 2/2015 | Stewart | .................. | B62B 3/022 |
| | | | | 280/38 |
| 2015/0063898 A1* | 3/2015 | Cheng | ...................... | B62B 7/008 |
| | | | | 403/98 |
| 2015/0336599 A1* | 11/2015 | Cheng | ...................... | B62B 7/008 |
| | | | | 280/642 |
| 2018/0027989 A1* | 2/2018 | Pos | ......................... | B62B 7/142 |
| 2018/0194385 A1* | 7/2018 | Yuan | ......................... | B62B 9/26 |

FOREIGN PATENT DOCUMENTS

| | | |
|---|---|---|
| CN | 203864753 U | 10/2014 |
| CN | 204978800 U | 1/2016 |
| GB | 2478622 A | 9/2011 |

* cited by examiner

CART

BACKGROUND OF THE INVENTION

Field of the Invention

The present disclosure relates to a cart, in particular a baby stroller and a golf trolley having three or more wheels, and more particularly, to a folding joint mechanism on the left and right sides of the cart.

Description of the Related Art

A cart, in the present disclosure, generally including the baby stroller and the golf trolley having three or more wheels, and the present disclosure, more particularly relates to the baby stroller. The following description of the disclosure is further explained by way of a four-wheel baby stroller.

In the prior art, a large number of baby strollers having the gears with few gear teeth, but the following drawbacks should be alleviated even though the construction is simple thereof.

1. When the baby stroller is in an unfolded or folded state, at the status of the angle of rotation is specific, the contact ratio is definitely lower at the time of a gear engaged with the internal gear teeth of a rotatable member due to the few gear teeth of the gear, and the contact ratio is lower and the bearing stress of the unit tooth is heavier accordingly. Therefore, when an external force (including the folding or unfolding rotation force) is exerted on the folding joint, the gear will be damaged more easily and result in the shortage of the service life thereof.

2. Furthermore, the gear located in the cart generally is a complete gear, which an included angle defined in the peak of the two adjacent gear teeth can be divisible by 360°. In effect, there is more design freedom and flexibility restricted since in this design, the angle of the included angle of the bottom frame and the rear wheel frame is limited, and fails to provide a free adjustable function.

SUMMARY OF THE INVENTION

The primary object of the present disclosure is to provide a cart capable of enhancing the strength of the gear so as to extend the service life thereof.

Another object of the present disclosure is to provide a cart capable of adjusting the angle of the included angle of the frame freely so as to improve the freedom and flexibility of the product design.

To achieve the aforementioned object, in the disclosure a cart comprises an upper frame, a bottom frame, a rear wheel frame and at least a folding joint mechanism, and the folding joint mechanism is disposed among the upper frame, the bottom frame and the rear wheel frame, comprising a bottom frame joint connected to an end of the bottom frame, the bottom frame joint including a first opening and a first arc-rack formed on a portion of the edge of the first opening, an upper frame joint connected to an end of the upper frame, the upper frame including a second opening and a second arc-rack formed on a portion of the edge of the second opening, a rear wheel frame connected to an end of the rear wheel frame, and a linkage gear unit disposed between the bottom frame joint and the upper frame joint, the linkage gear unit having a first gear and a second gear rotating coaxially, and the first gear being engaged with the first arc-rack, the second gear being engaged with the second arc-rack, and wherein the first gear having a number $N1$ of gear teeth and the second gear having a number $N2$ of gear teeth, and the $N1$ and $N2$ are both greater than or equal to 6.

The aforementioned cart, in particular a baby stroller or a golf trolley having three or more wheels.

The aforementioned first arc-rack has a first axle center, a first tooth and a second tooth, and the second tooth is adjacent to the first tooth, the first tooth has a first end point connected with the first axle center to form a first virtual line, the second tooth has a second end point connected with the first axle center to form a second virtual line, and the second and first virtual lines define a first included angle $\theta1$. The second arc-rack has a second axle center, a third tooth and a fourth tooth, and the fourth tooth is adjacent to the third tooth, and wherein the third tooth has a third end point connected with the second axle center to form a third virtual line, the fourth tooth has a fourth end point connected with the second axle center to form a fourth virtual line, and the third and fourth virtual lines define a second included angle $\theta2$. The upper frame extends outwards toward a first direction, the bottom frame extends outwards toward a second direction and the rear wheel frame extends outwards toward a third direction, and the second and third directions define a third included angle $\theta3$, the third and the first directions define a fourth included angle $\theta4$, and further $N1$, $N2$, $\theta1$, $\theta2$ meet the following relations:

$$360/\theta1 = N3, \theta1 > 0;$$

$$360/\theta2 = N4, \theta2 > 0; \text{ and}$$

$$(N2/N4)*(N3/N1) = \theta4/\theta3, \text{ and both } \theta3 \text{ and } \theta4 \text{ fall within a range of } 30°\sim150°.$$

At least one of the aforementioned numbers $N3$ and $N4$ of gear teeth of the first and second arc-racks is not a positive integer.

Both of the aforementioned numbers $N1$ and $N2$ of gear teeth of the first and second gears are positive integers.

The sum of the aforementioned third included angle $\theta3$ and the fourth included angle $\theta4$ falls within a range of $120°\sim240°$.

The aforementioned first and second gears are separate parts.

The aforementioned first and second gears are fixedly attached.

The aforementioned linkage gear unit further comprises a base disposed between the first and the second gears, and the diameter of the base is greater than the diameter of the first gear.

In a preferred embodiment, the cart comprises an upper frame extending outwards toward a first direction, a bottom frame extending outwards toward a second direction and a rear wheel frame extending outwards toward a third direction, and at least a folding joint mechanism disposed among the upper frame, the bottom frame and the rear wheel frame. The folding joint mechanism comprises a bottom frame joint connected to an end of the bottom frame, the bottom frame joint including a first opening and a first arc-rack formed on a portion of the edge of the first opening, an upper frame joint connected to an end of the upper frame, the upper frame joint including a second opening and a second arc-rack formed on a portion of an edge of the second opening, and a rear wheel frame joint connected to an end of the rear wheel frame, and a linkage gear unit disposed between the bottom frame join and the upper frame joint, the linkage gear unit having a first gear and a second gear rotating coaxially,
} and the first gear engaging with the first arc-rack and the second gear engaging with the second arc-rack, and the first gear having a number N1 of gear teeth, the second gear having a number N2 of gear teeth, and the first arc-rack having a first axle center, a first tooth and a second tooth, and the second tooth being adjacent to the first tooth, and wherein the first tooth having a first end point connected with the first axle center to form a first virtual line, the second tooth having a second end point connected with the first axle center to form a second virtual line, and the second and first virtual lines defining a first included angle θ1. The second arc-rack has a second axle center, a third tooth and a fourth tooth, and the fourth tooth being adjacent to the third tooth, and wherein the third tooth having a third end point connected with the second axle center to form a third virtual line, the fourth tooth having a fourth end point connected with the second axle center to form a fourth virtual line, and the third and the fourth virtual lines defining a second included angle θ2. The first and second arc-racks have the numbers N3 and N4 of gear teeth, the second and the third directions define a third included angle θ3, and the third and the first directions define a fourth included angle θ4, and wherein N1, N2, θ1 and θ2 meet the following relations:

$$360/\theta1=N3, \theta1>0;$$

$$360/\theta2=N4, \theta2>0; \text{ and}$$

$$(N2/N4)*(N3/N1)=\theta4/\theta3, \text{ and both } \theta3 \text{ and } \theta4 \text{ fall within a range of } 30°\sim150°,$$

and at least one of N3 and N4 is not a positive integer, both N1 and N2 are positive integers, and both θ3 and θ4 fall within a range of 30°~150°.

The aforementioned cart in particular a baby stroller or a golf trolley having three or more wheels.

Both of the aforementioned numbers N 1 and N2 of gear teeth of the first and second gears are greater than or equal to 6.

The aforementioned first, second and third directions of the bottom frame, upper frame and rear wheel frame are different directions.

The sum of the aforementioned third included angle θ3 and the fourth included angle θ4 falls within a range of 120°~240°.

The aforementioned first and second gears are independently separate parts.

The aforementioned first and second gears are fixedly attached together.

The aforementioned linkage gear unit further comprises a base disposed between the first gear and the second gear, and the diameter of the base is greater than the diameter of the first gear.

DETAILED DESCRIPTION OF THE PREFERRED EMBODIMENTS

As shown in the drawings, for the purpose of illustration, the present disclosure is preferably embodied in the constructions, features and efficiency thereof as following.

With reference to FIGS. 1 to 6, a cart in the present disclosure comprises a bottom frame 1, an upper frame 2, a rear wheel frame 3 and at least a folding joint mechanism 100.

The lower end of the bottom frame 1 at least is provided with a front wheel 11, the upper end is connected to a bottom frame joint 10, and the bottom frame joint 10 has a recess 2 formed at the lower end of the outer edge of the bottom frame joint 10, a first opening 13 formed at the upper end of the inner side of the bottom frame joint 10, and a first arc-rack 14 formed on a portion of the edge (the upper edge) of the first opening 13.

The upper end of the upper frame 2 is provided with a handle 21, the lower end is connected to an upper frame joint 20, and the upper frame joint 20 has a recess 22 formed at the lower end of the outer edge of the upper frame joint 20, a second opening 23 formed at the upper end of the inner side of the upper frame joint 20, and a second arc-rack 24 formed on a portion of the edge (the bottom edge) of the second opening 23.

The lower end of the rear wheel frame 3 at least is provided with a rear wheel 31, the upper end at least is connected to a rear wheel frame joint 30, and the rear wheel frame joint 30 has a recess 32 formed at the lower end of the outer edge of the rear wheel frame joint 30.

The at least one folding joint mechanism 100 is disposed among the bottom frame 1, the upper frame 2 and the rear wheel frame 3, comprising the bottom frame joint 10, the upper frame joint 20, the rear wheel frame joint 30 and a linkage gear unit 4, and the linkage gear unit 4 being disposed between the bottom frame joint 10 and the upper frame joint 20 having mutually separate first and second gears 41, 42, and the first and second gears 41, 42 axially mounted to a side of the rear wheel frame joint 30 by a pin 40 and rotating coaxially, the gear 41 positioned to engage the first arc-rack 14 of the bottom frame joint 10, and the second gear 42 positioned to engage the second arc-rack 24 of the upper frame joint 20; wherein the numbers N1 and N2 of gear teeth of the first gear 41, 42 are greater than or equal to 6 and both are positive integers. The numbers N1 and N2 on the actual product are less than 100. In this embodiment, the number of gear teeth of the first gear 41 can be seven teeth, and the number of gear teeth of the second gear 42 can be six teeth.

The at least one folding joint mechanism 100 comprises the left side and right side folding joint mechanism, the left side and right side folding joint mechanism may have the same constructions, with one being the mirror image of the other. It is noteworthy that the following description is depicted in singular number (side), but the description will apply to both left and right sides.

The bottom frame joint 10, the upper frame joint 20 and the rear wheel frame joint 30 are linear arrangement, combined and locked fixedly by a fixed threaded device 33, for example a screw, so that the bottom frame joint 10 locates between the upper frame joint 20 and the rear wheel frame joint 30, and the recesses 12, 22, 32 thereof are arranged linearly, and the first and second arc-racks 14, 24 and the linkage gear unit 4 are mutually engaged to form a gear set.

The at least one folding joint mechanism 100 located at the front and rear ends of the rear wheel frame joint 30 is defined with a control mechanism 5 and a pull buckle 6 respectively, a first latch is formed by the control mechanism 5 and locked when the baby stroller is unfolded, and further a second safety lock is formed by the pull buckle 6 to prevent the unintended folding of the stroller.

Figure 7:
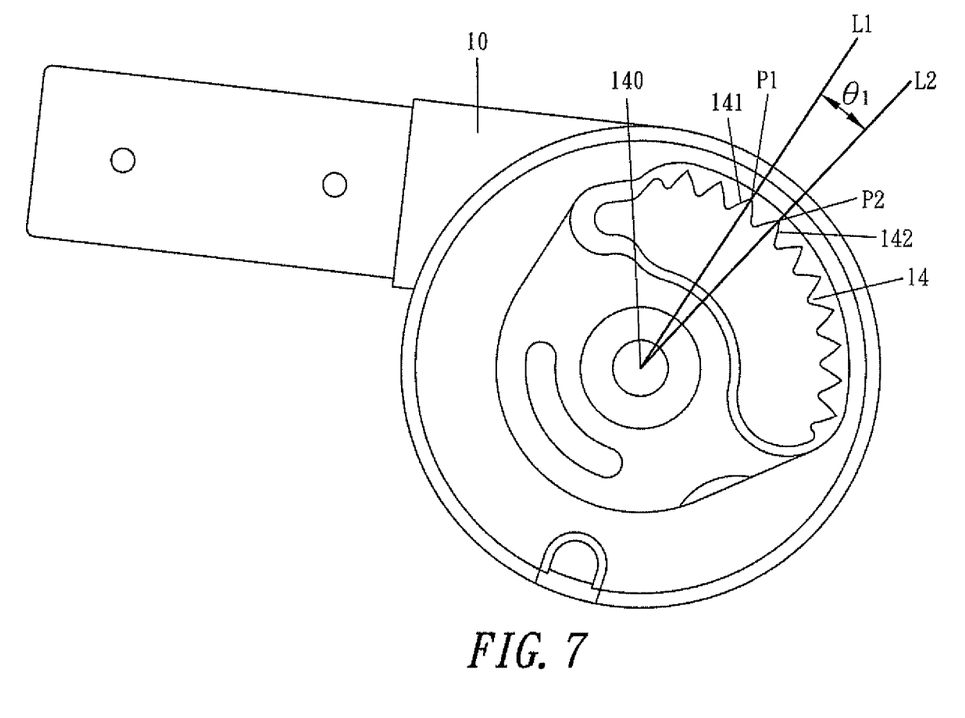
FIG. 7 is an enlarged view of a portion of a first arc-rack of a lower frame joint of FIG. 3.
Figure 8:
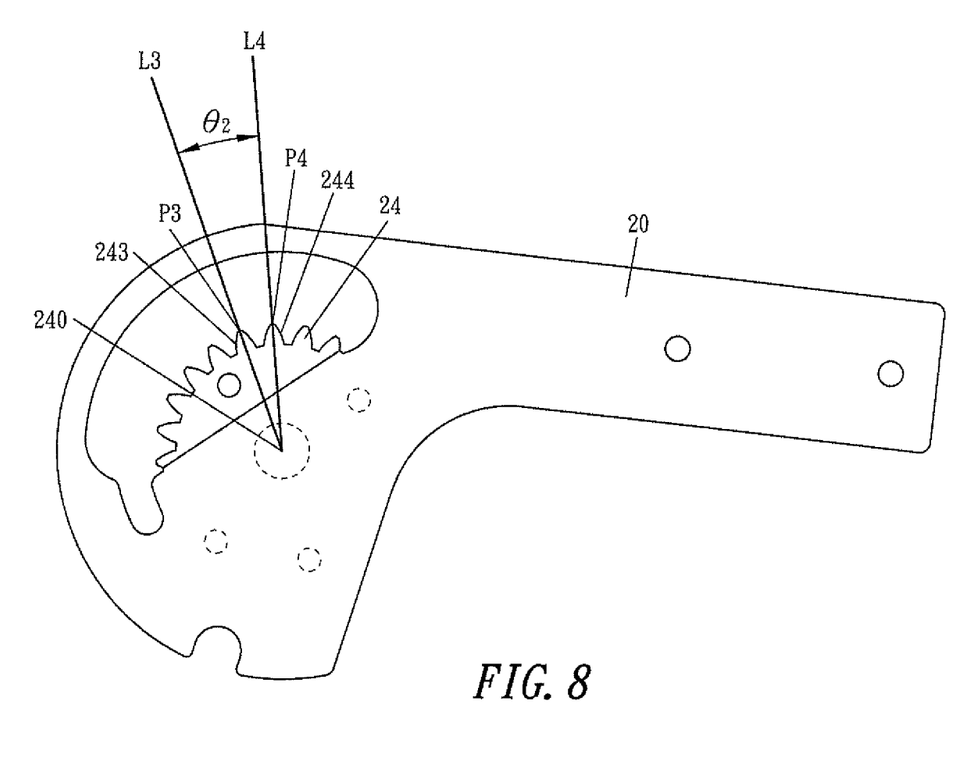
FIG. 8 is an enlarged view of a portion of a second arc-rack of an upper frame joint of FIG. 3.

With reference to FIGS. 7 and 8, the first arc-rack 14 of the bottom frame joint has a first axle center 140, a first tooth 141 and a second tooth 142 respectively, and the second tooth 142 is adjacent to the first tooth 141, the first tooth 141 has a first end point connected with the first axle center 140 to form a first virtual line L1, the second tooth 142 has a second end point $P_2$ connected with the first axle center 140 to form a second virtual line L2, and the second virtual line L2 and the first virtual line L1 define a first including angle 61.

The second arc-rack 24 has a second axle center 240, a third teeth 243 and a fourth tooth 244 respectively, and the fourth tooth 244 is adjacent to the second tooth 243, the third tooth 243 has a third end point P3 connected with the second axle center 240 to form a fourth virtual line L4, and the third virtual line L3 and the fourth virtual line L4 define a second included angle θ2.

Figure 1:
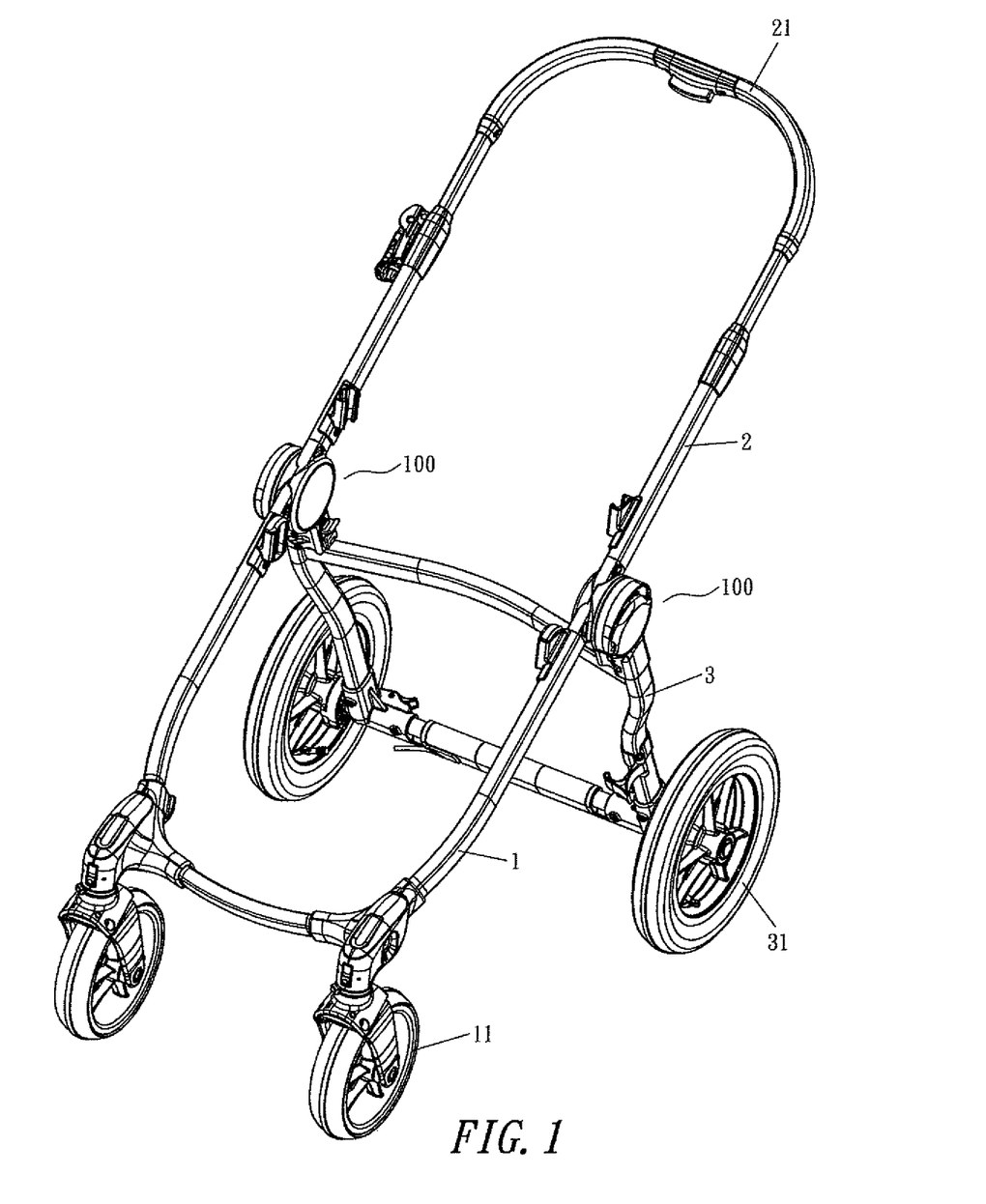
FIG. 1 is a perspective view of a cart of the present disclosure in an unfolded state.
Figure 2:
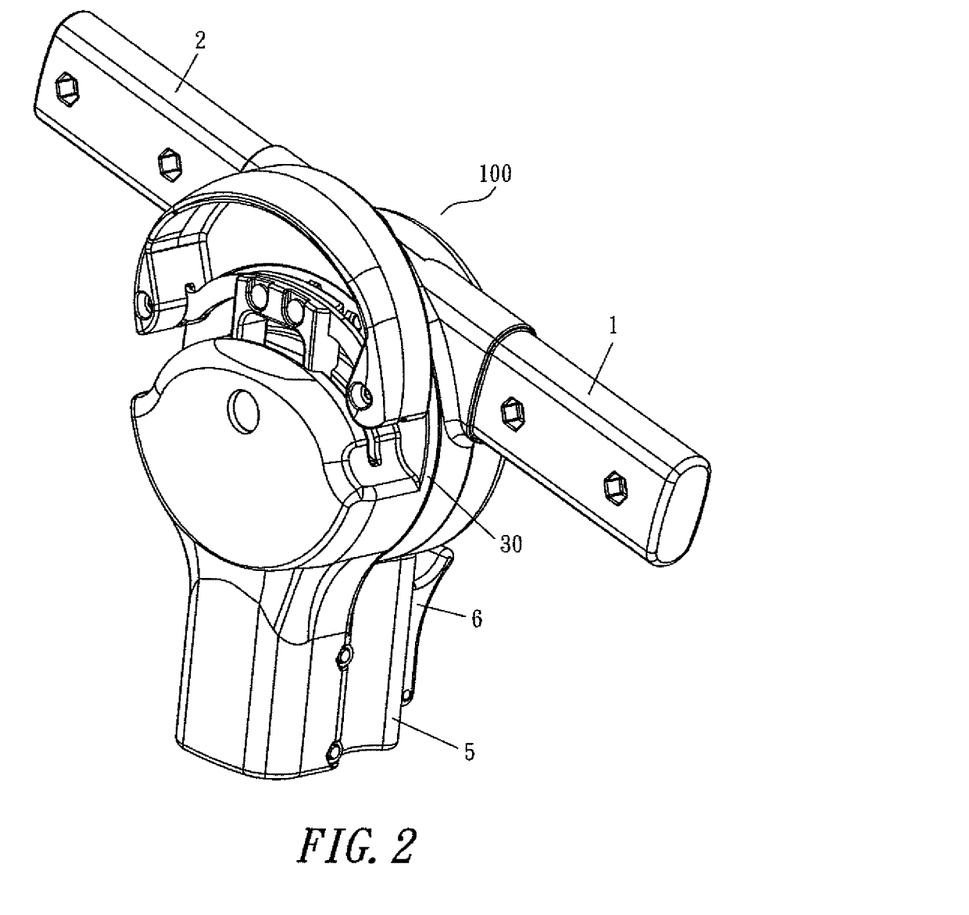
FIG. 2 is a perspective view of a rear side of a folding joint mechanism of FIG. 1.
Figure 3:
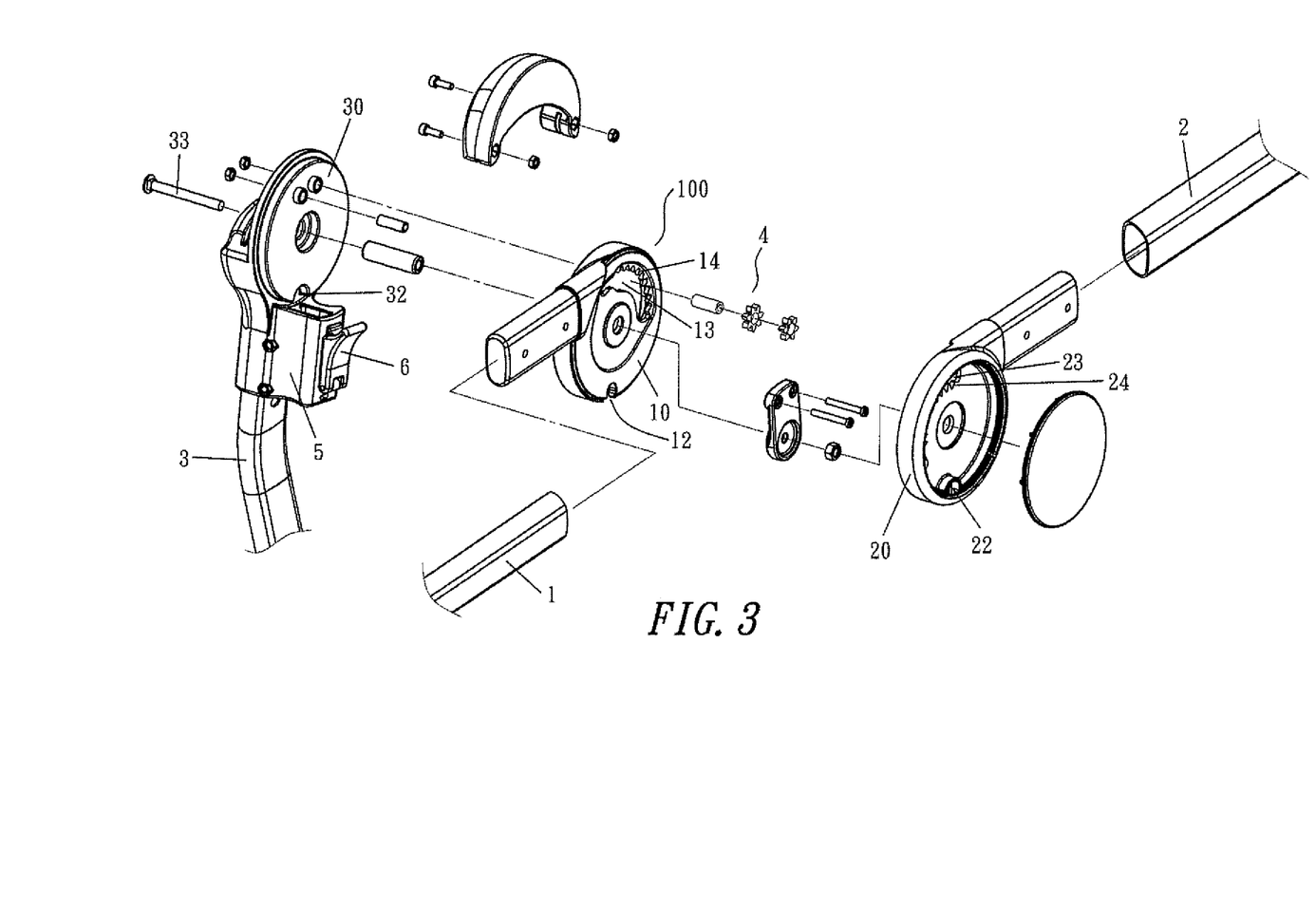
FIG. 3 is an exploded view of the folding joint mechanism of FIG. 1.
Figure 4:
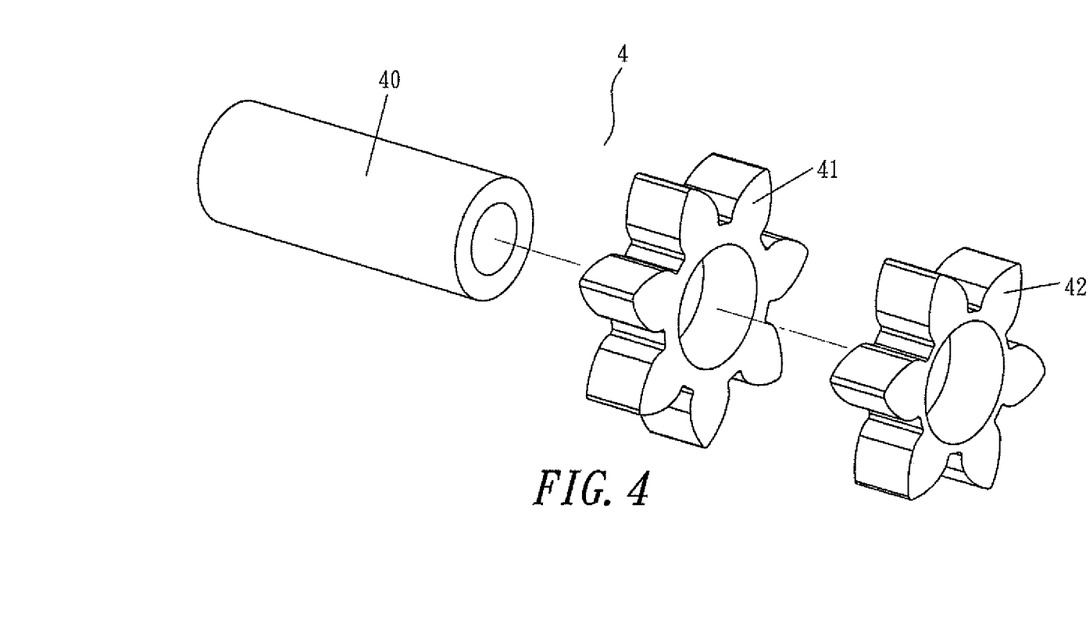
FIG. 4 is an enlarged view of a portion of a linkage gear unit of FIG. 3.
Figure 5:
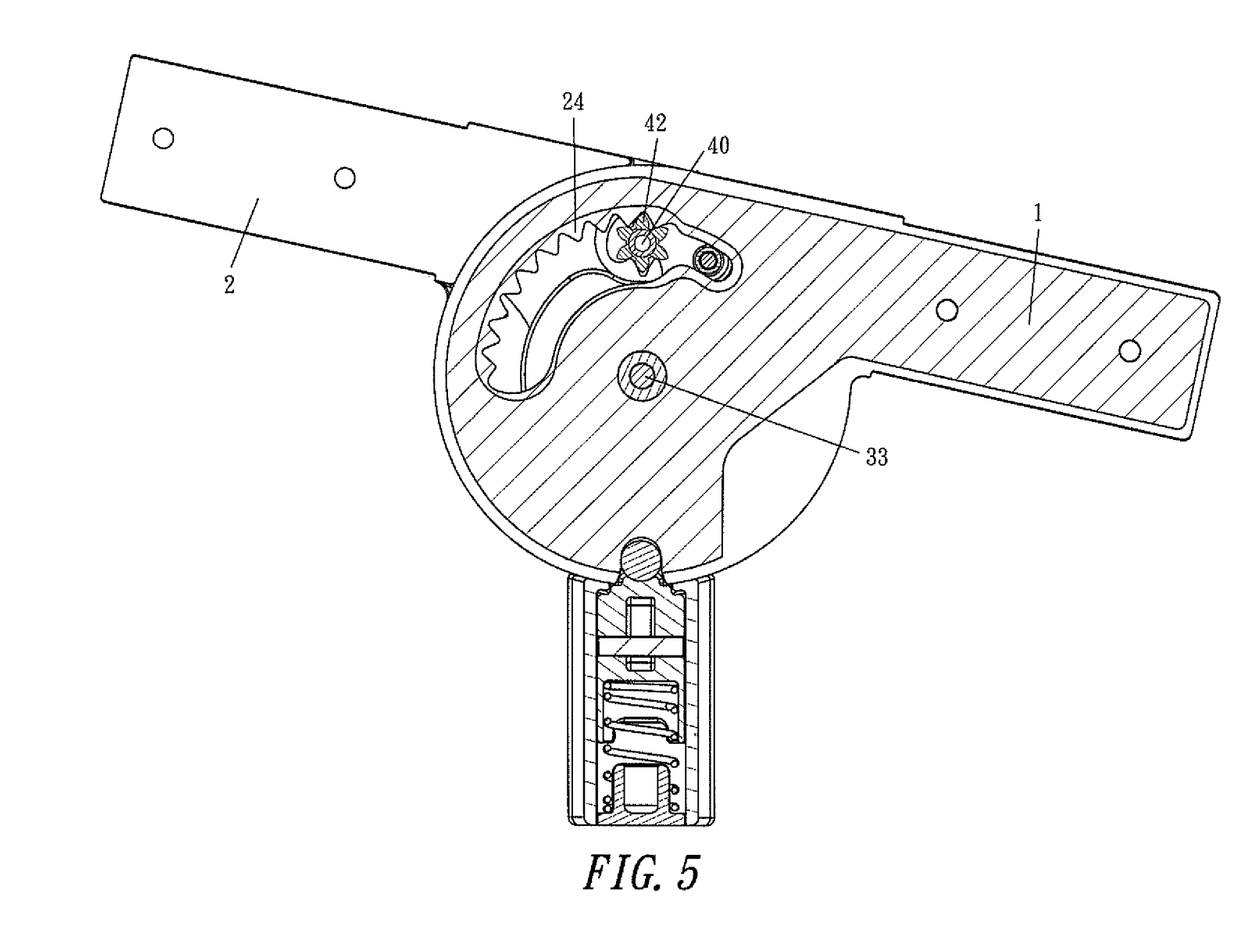
FIG. 5 is a cross-sectional view of combination of the folding joint mechanism of FIG. 1.
Figure 6:
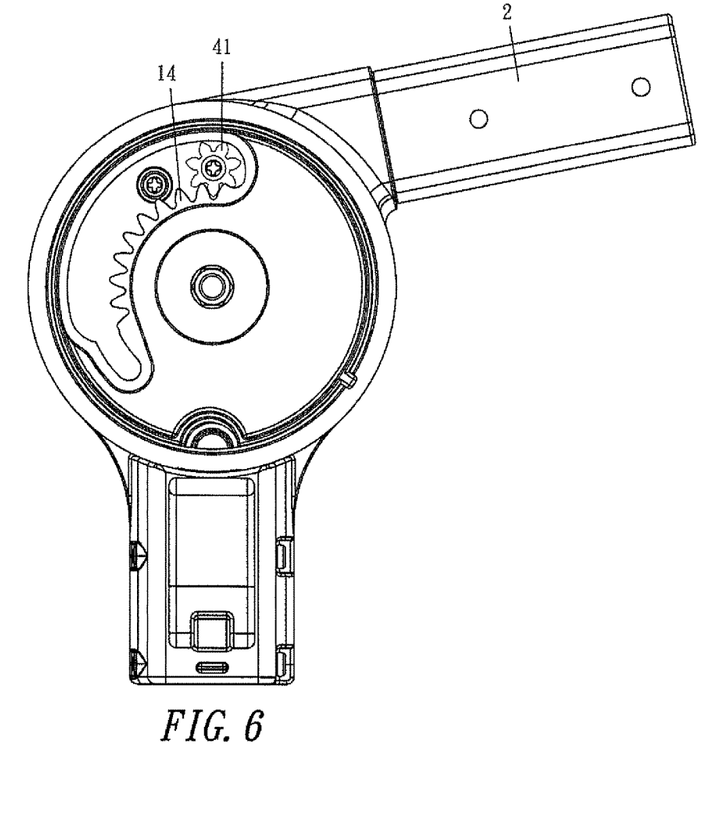
FIG. 6 is a schematic view of another side of the folding joint mechanism of FIG. 1.
Figure 9:
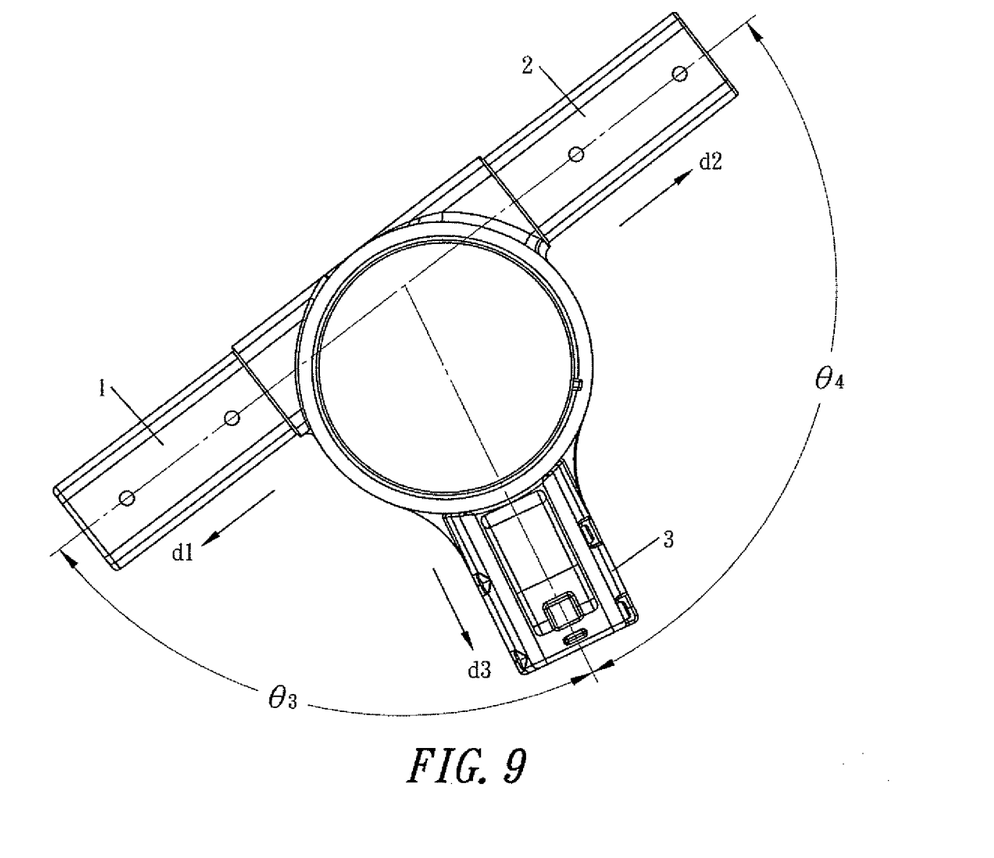
FIG. 9 is a side view showing the included angle between the frames in an unfolded state.

As shown in FIGS. 1 and 9, when the cart frame is in a fully unfolded state, the upper frame 2 extends outwards toward a first direction $d_1$, the bottom frame 1 extends outwards toward a second direction $d_2$ and the rear wheel frame 3 extends outwards toward a third direction $d_3$, and the second direction $d_2$ and the third direction $d_3$ define a third included angle $\theta_3$, and the third direction $d_3$ and the first direction $d_1$ define a fourth included angle $\theta_4$.

According to the aforementioned construction, the gear design of the at least one folding joint mechanism 100 must meet the following relations:

$$360/\theta_1 = N_3, \theta_1 > 0;$$

$$360/\theta_2 = N_4, \theta_2 > 0; \text{ and}$$

$$(N_2/N_4)*(N_3/N_1) = \theta_4/\theta_3; \text{ and}$$

wherein $N_3$ is the number of gear teeth of the first arc-rack 14, $N_4$ is the number of gear teeth of the second arc-rack 24, and both the numbers N1 and N2 of gear teeth of the first and second gears 41, 42 are positive integers, and at least one of the numbers N3 and N4 of gear teeth of the first and second arc-racks 14, 24 is not a positive integer. The angle of the third included angle $\theta_3$ and the fourth included angle $\theta_4$ falls within a range of 30°~150°, and the sum of $\theta_3$ and $\theta_4$ falls within a range of 120~240°. When the sum of the two included angles falls within this range, the cart with the angle in a full unfolded state will be more stable.

In a further example, when the design conditions are $\theta_3=80°$ and $\theta_4=100°$, selecting $N_1=7$, $N_2=6$ and $N_3=30$ and meantime N4=20.57 will be obtained by means of the relations, and wherein $N_4$ is an incomplete tooth. In another example, when the design conditions are $\theta_3=80°$ and $\theta_4=100°$, selecting $N_1=10$, $N_2=8$ and $N_3=40.87$ and meantime N4=26.16 will be obtained by means of the relations, and wherein $N_3$ and $N_4$ are incomplete teeth. In another example, when the design conditions are $\theta_3=85°$ an $\theta_4=95°$, selecting N1=11, $N_2=7$ and $N_4=25$ and meantime $N_3=43.9$ will be obtained by means of the relations, and wherein $N_3$ is the incomplete tooth. In effect, the design freedom and flexibility will be enhanced on the product design.

In summation of the description above, the present disclosure has at least one of the following advantages and effects and has more great advance than the prior art.

1. When the angle of rotation in an unfolding or folding state is unchanged, the contact ratio of the gear and the arc-rack is increased since the numbers N1 and N2 of gear teeth of the first and second gears 41, 42 are greater than or equal to 6. Not only more gear teeth will provide the supporting force but also the stress exerted on a unit teeth is decreased significantly, so that the strength of the gear teeth is enhanced, and the service life is extended effectively.

2. Since the numbers of gear teeth of the first and second gears 41, 42 are greater than or equal to 6, the coaxial rotation can be achieved, and the number of gear teeth and the modulus of the gear can be changed, so as to improve the freedom and flexibility of the gear design significantly.

3. Since at least one of the first and second arc-racks 14, 24 is an incomplete tooth, the included angle $\theta_1$ defined between the bottom frame 1 and the rear wheel frame 3 can be changed or adjusted freely, so as to improve the freedom and flexibility of the frame design.

Figure 10:
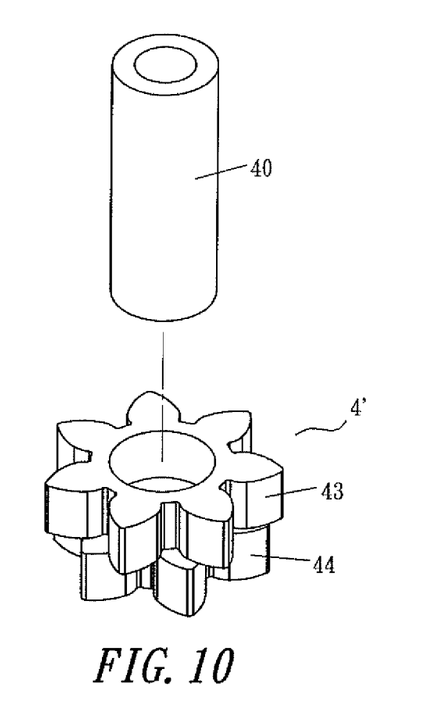
FIG. 10 is a perspective view of a linkage gear unit in accordance with a second preferred embodiment of the present disclosure.

With reference to FIG. 10 for the second embodiment of the linkage gear unit, in this embodiment the linkage gear unit 4' is composed of the first and second gears 43, 44 and is mounted by a pin 40 to rotate coaxially, and the first and second gears 43, 44 are fixedly attached together by welding or some other manner for rotating together as a unit on the pin 44, and wherein the number of gear teeth of the first gear 43 is seven and the number of gear teeth of the second gear is six, so that for the purpose of achieving the same efficacy as the abovementioned first embodiment.

Figure 11:
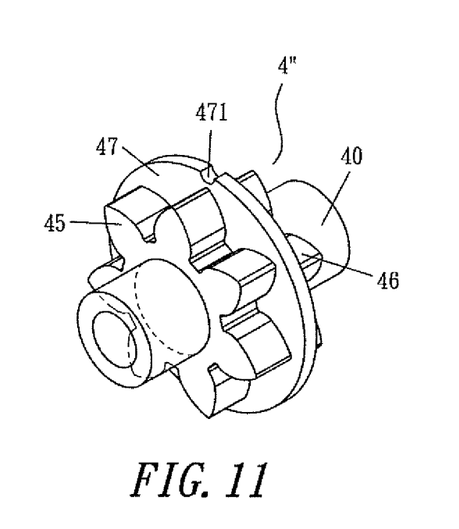
FIG. 11 is a perspective view of a linkage gear unit in accordance with a third preferred embodiment of the present disclosure.
Figure 12:
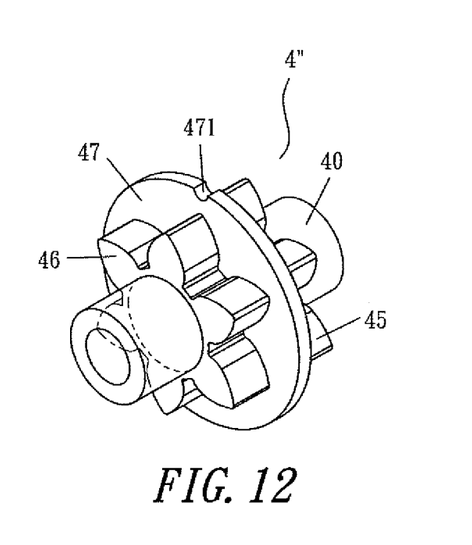
FIG. 12 is another perspective view of another side of a linkage gear unit in accordance with the third preferred embodiment of the present disclosure.

With reference to FIGS. 11 and 12 for third embodiment of the linkage gear unit, the linkage gear unit 4" comprises a first and a second gear 45, 46, a base 47 is disposed between the first and second gears 45, 46, and a pin 40 is provided for the first and second gears 45, 46 being passed and mounted to the base 47. The diameter of the base 47 is greater than the diameter of the first and second gears 45, 46, and includes a notch 471 thereto for recognizing and installing, so that for the purpose of achieving the same efficacy as the above mentioned first embodiment.

Figure 13A:
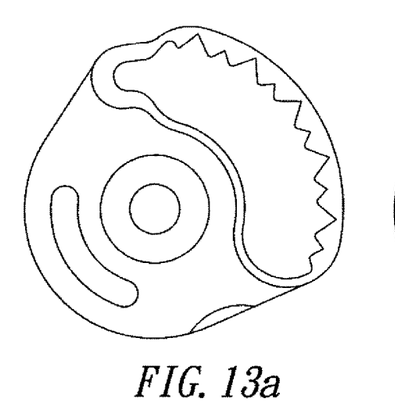
FIGS. 13a~13d are schematic views of different states of first and second teeth units of the present disclosure.
Figure 13B:
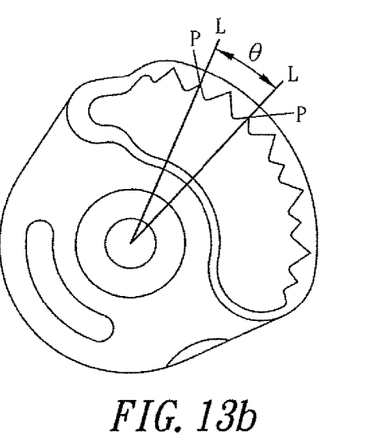
Figure 13C:
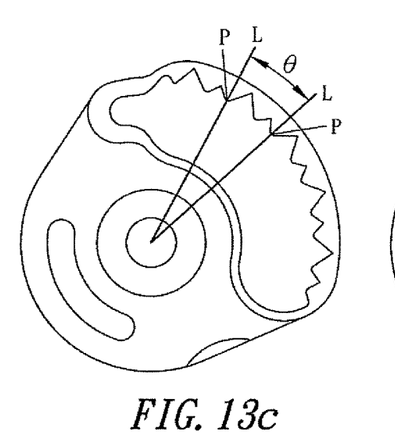
Figure 13D:
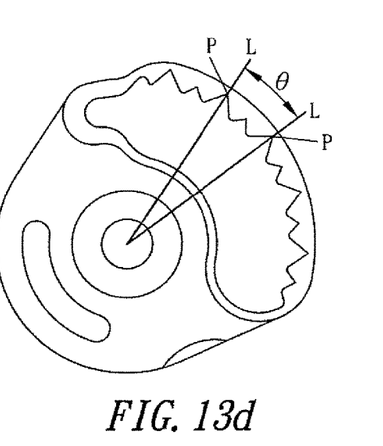
Figure 14A:
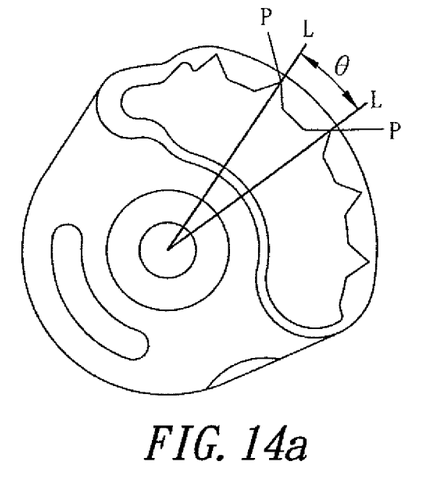
FIGS. 14a~14b are schematic views of another two states of the first and second teeth units of the present disclosure.
Figure 14B:
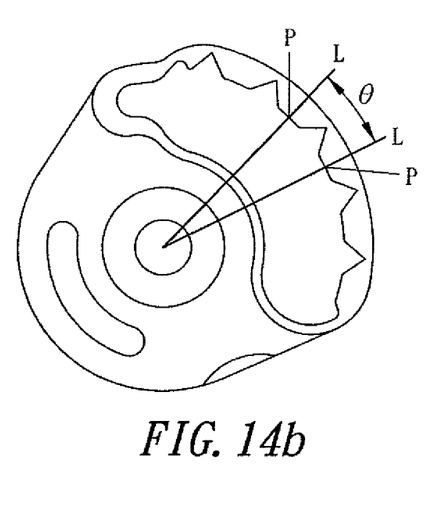

With reference to FIGS. 13a~13d, 14a, and 14b for the design of different states related to the first and second teeth in the first and second arc-racks of the present disclosure, and the states are embodied for the purpose of depicting the first and second gear teeth, and the concept related to the two adjacent teeth can be indicated by means of the adjacent first gear tooth unit and second gear tooth unit. As shown in FIG. 13a, as long as the repeatedly representative end point P and virtual line L are included in the two adjacent gear teeth units, the first gear teeth unit comprises one large gear teeth and one small gear teeth, and the second gear teeth unit and the first gear teeth unit are repeated periodic design, and herewith the included angle θ of the gear teeth units is calculated from the repeated points of the first gear teeth unit and the second teeth gear unit, that is the disclosure can be implemented with the condition of a periodic unit with an effective contact.

What is claimed is:

1. A cart, comprising:
   an upper frame extending outwards toward a first direction;
   a lower frame extending outwards toward a second direction;
   a rear wheel frame extending outwards toward a third direction;
   at least one folding joint mechanism disposed among the upper frame, the bottom frame and the rear wheel frame, and comprising:
      a bottom frame joint connected to an end of the bottom frame, and the bottom frame joint including a first opening, and a first arc-rack formed on a portion of an edge of the first opening;
      an upper frame joint connected to an end of the upper frame, and the upper frame joint including a second opening, and a second arc-rack formed on a portion of an edge of the second opening;
      a rear wheel frame joint connected to an end of the rear wheel frame; and
      a linkage gear unit disposed between the bottom frame joint and the upper frame joint, and the linkage gear unit having a first gear and a second gear, and the first gear and the second gear rotating coaxially, and wherein the first gear being engaged with the first arc-rack and the second gear being engaged with the second arc-rack, and the first gear having a number N1 of gear teeth and the second gear having a number N2 of gear teeth, and the first arc-rack having a first axle center, a first tooth and a second tooth, and the second tooth being adjacent to the first tooth, and the first tooth having a first end point connected to the first axle center to form a first virtual line and the second tooth having a second end point connected to the first axle center to form a second virtual line, and the second virtual line and the first virtual line defining a first included angle θ1, and the second arc-rack having a second axle center, a third tooth, and a fourth tooth, and the fourth tooth being adjacent to the third tooth, the third tooth having a third end point being adjacent to the second axle center to form a third virtual line and the fourth tooth having a fourth end point being adjacent to the second axle center to form a fourth virtual line, and the third virtual line and the fourth virtual line defining a second included angle θ2, and the first and second arc-racks having the numbers N3 and N4 of gear teeth, and the upper frame extending outwards toward a first direction, the bottom frame extending outwards toward a second direction and the rear wheel frame extending outwards toward a third direction, and the second direction and the third direction defining a third included angle θ3 and the third direction and the first direction defining a fourth included angle θ4, and wherein N1, N2, θ1, and θ2 meeting the following relations:

360/θ1=N3, θ1>0;

360/θ2=N4, θ2>0; and (N2/N4)*(N3/N1)=θ4/θ3, and both θ3 and θ4 fall within a range of 30°~150'; and at least one of N3 and N4 is not a positive integer, and both N1 and N2 are positive integers.

2. The cart of claim 1, wherein the cart is particularly a baby stroller or a golf trolley having three or more wheels.

3. The cart of claim 1, wherein both of the numbers N1 and N2 of gear teeth of the first and second gears are greater than or equal to 6.

4. The cart of claim 1, wherein the first direction, the second direction and the third direction are different directions.

5. The cart of claim 1, wherein the sum of the third included angle and the fourth included angle falls within a range of 120°~240°.

6. The cart of claim 1, wherein the first gear and the second gear are independently separate parts.

7. The cart of claim 1, wherein the first gear and the second gear are fixedly attached together.

8. The cart of claim 1, wherein the linkage gear unit further comprises a base disposed between the first gear and the second gear, and the diameter of the base is greater than the diameter of the first gear.

9. The cart of claim 8, wherein the base includes a notch.

* * * * *